Figure 3:
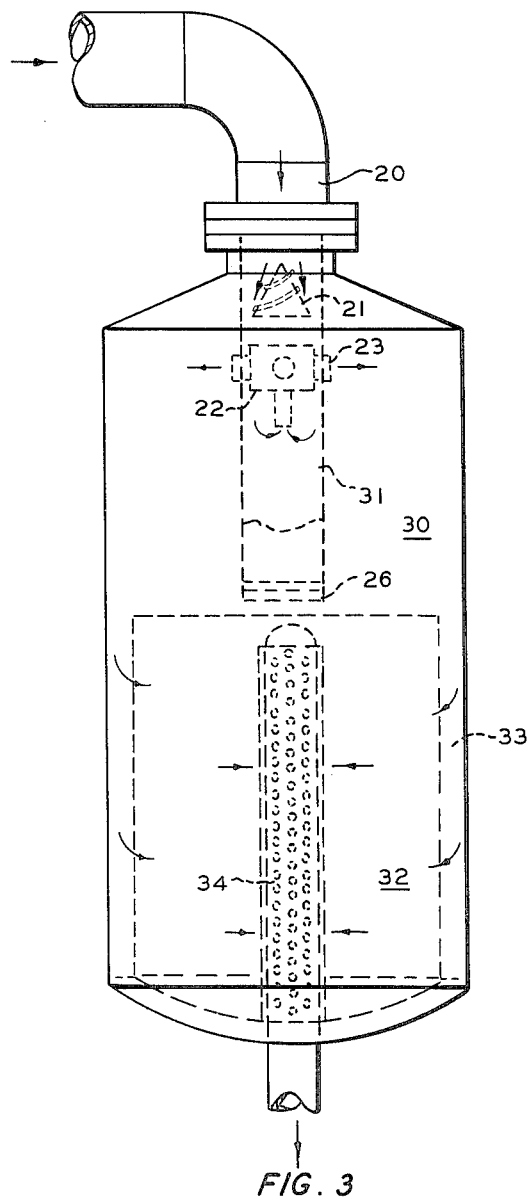

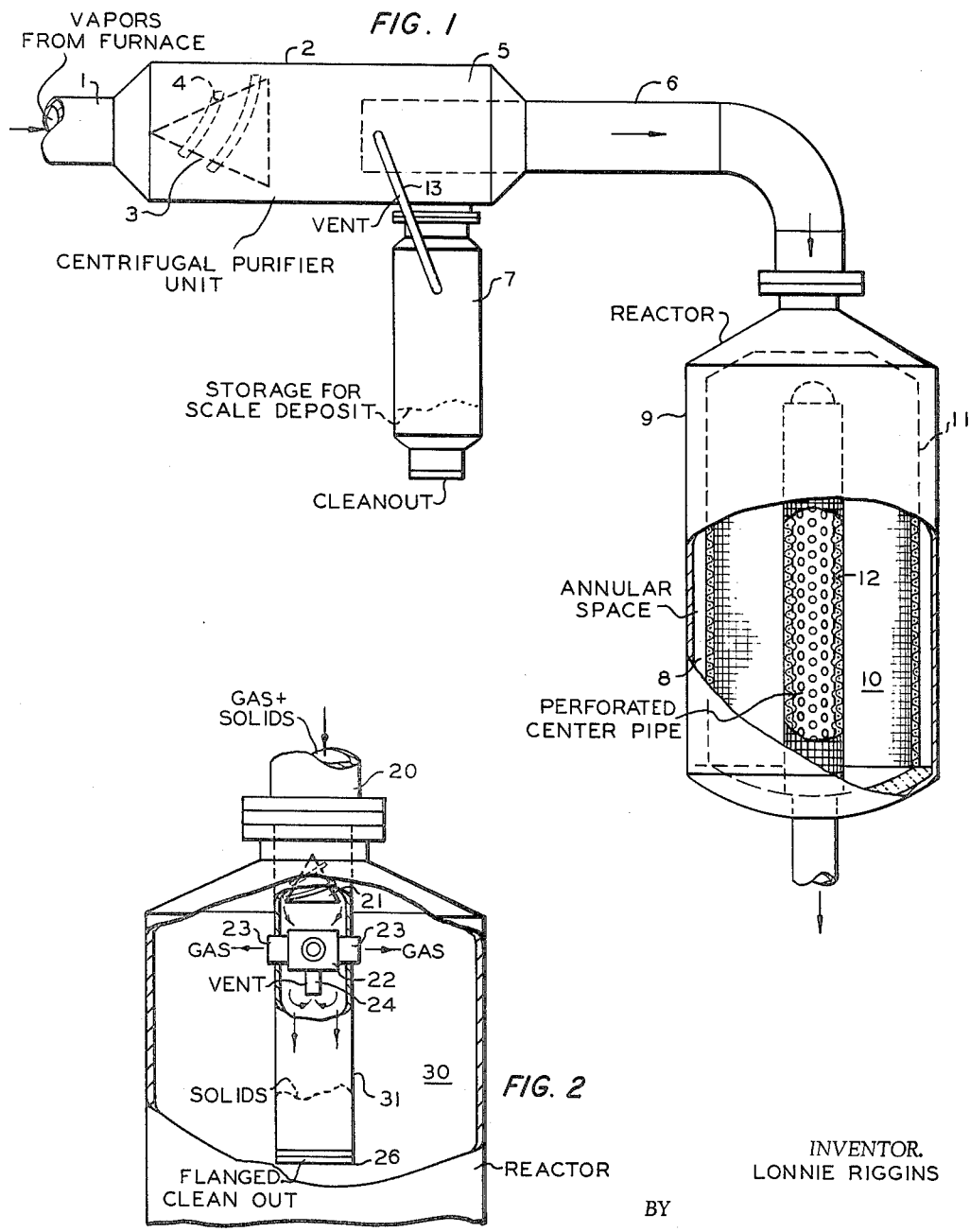

INVENTOR.
LONNIE RIGGINS
BY
ATTORNEYS

United States Patent Office 3,235,343
Patented Feb. 15, 1966

3,235,343
REMOVAL OF SCALE OR OTHER ENTRAINED SOLIDS FROM FLUID TO BE TREATED
Lonnie Riggins, Borger, Tex., assignor to Phillips Petroleum Company, a corporation of Delaware
Filed Sept. 11, 1962, Ser. No. 222,838
1 Claim. (Cl. 23—288)

This invention relates to the removal of scale or other solids from a fluid to be treated.

In one of its aspects this invention relates to the centrifugal removal of solids or scale entrained or carried in a fluid which is to be treated in a subsequent zone in which the said scale or solids are undesired. In a further aspect, the invention relates to an apparatus wherein entrained solid particles in a fluid or vapor are caused to agglomerate peripherally in the fluid as it flows through a pipe whereupon the fluid is caused to reverse its direction of flow and to pass into an axially disposed pipe and from said axially disposed pipe to further treatment, while the peripherally agglomerated solids are collected. In another of its aspects, the invention relates to an apparatus wherein entrained solids in a fluid to be treated are caused to collect peripherally in said fluid as it flows through a pipe, the peripherally agglomerated solids being passed into an annulus formed by the insertion of a second pipe into the first mentioned pipe and wherein the fluid or vapor from which the solids have been thus separated is passed into said second pipe and by way of said second pipe to further treatment.

In a further aspect of the invention, there is provided apparatus wherein and whereby a vapor flowing into a conversion zone, as in the reforming of naphtha, is caused to rotate, thus causing entrained scale or solids therein to agglomerate peripherally and to pass into a collecting zone or section while the vapor is then removed and passed on for further treatment, as later described.

In the treatment of fluids, as in the catalytic reforming of naphtha, there can be encountered a considerable problem due to the accumulation of scale or other solids which deposit in various parts of a treating or conversion zone causing undesired patterns of flow or blocking of flow of the fluid to be treated or converted in such a manner as to even endanger, let alone spoil, the operation. In an operation as herein described, scale (FeS) is formed on the inside of furnace tubes in which the naphtha is heated and is subsequently broken off, entrained in the heated vapor stream and carried to the reactor. These particles are then deposited in an annular space which is formed by the reactor vessel wall and a wire mesh containing the catalyst. The small cross sectional area of the annular space which is used is such that sizable depths of collected or deposited scale (1 to 13 feet) are accumulated during periods of continuous operation. It will be understood by one skilled in the art that the annular space is purposefully kept small so that the conversion or reforming or other treatment which is desired to be catalytically performed will be largely performed in the presence of the catalyst.

It will also be understood that the scale accumulation decreases the available free area of flow and thereby increases the weight hourly space velocity. However, in the scale deposit locus, there is effected a long residence time for reactants. This can result in a reaction known as demethylation which is very exothermic and is in effect a chain reaction in the sense that it is self-supporting. This not only interrupts normal processing operation but is a very dangerous condition due to the extremely high temperatures that can occur. In one such operation accumulated scale actually caused these high temperatures to occur and the operation had to be shut down.

Furthermore, the cleanout of the scale which accumulates in the annular space is not only a difficult, but also a very costly, operation. Indeed, it is necessary to remove the catalyst and wire mesh from the reactor before the scale deposits can be reached so that these can be removed.

It is an object of this invention to remove solids or scale entrained or carried by a fluid about to be treated. It is a further object of this invention to provide apparatus for the removal of entrained solids from a vapor about to be converted. It is a further object of this invention to provide an improved catalytic conversion operation in which solids which may interfere with the conversion are removed from the fluid or vapor before it is contacted with the catalyst. It is a still further object of the invention to provide an improved naphtha reforming operation.

Other aspects, objects, and the several advantages of this invention are apparent from a study of the foregoing disclosure, drawing and the claim.

According to the present invention, the fluid or vapor to be treated is subjected to a centrifugal force causing solids therein to agglomerate at the periphery thereof, and thus conditioned, the fluid is passed on for treatment while the solids are retained or collected as desired.

In the drawing, FIGURE 1 shows an apparatus in which the invention can be effected employing an external solids separation and accumulation apparatus. FIGURE 2 shows in some detail a solids separation section of a reactor which contains the solids separation section therein. FIGURE 3 shows a reactor containing a concentrically disposed catalytic bed in its lower section and, in its upper section, a solids from fluid separation section.

Referring now to FIGURE 1, a petroleum fraction boiling in the approximate range 200° F.–400° F. containing approximately 0.01–0.1 weight percent sulfur is preheated by heat exchange equipment and by a furnace, not shown, and enters by 1 into separation chamber 2 passing into contact with cone 3 equipped with vanes 4 which, due to the motion of the fluid, impart a rotational motion thereto. This causes solids carried by the fluid to accumulate peripherally in vessel 2 and to pass into annulus 5, formed in vessel 2 by pipe 6, which extends thereinto from the downstream end of vessel 2 for a substantial distance. Accumulated solids are transferred to solids or scale storage vessel 7 while vapors pass into pipe 6 and from pipe 6 into annulus 8, formed in vessel 9 by the body of catalyst 10, retained therein by means of screen 11. The vapors pass radially from annulus 8 into collecting pipe 12 and from pipe 12 from the vessel. The annular space here described is about 2 to 4 inches in diameter, depending upon the shape of the screen and on the particular operation involved. Usually the annulus will be rather small for reasons described herein. In the presently described embodiment of the invention, the annulus is 2⅛ inches in diameter. A vent pipe 13 connects the upper portion of vessel 7 with vessel 2.

Referring to FIGURE 2, vapor and solids pass downwardly through pipe 20 into contact with conically shaped centrifugal deflector 21 and downwardly past header 22 into assembly 31 at the downstream end of pipe 20. Solids are deposited at the bottom of assembly 31 while vapors turn upwardly, entering axially disposed vent pipe 24. The vapors pass into header 22 and radially from header 22 by pipes 23 into reactor 30 for conversion. For sake of simplicity, only a portion of reactor 30 has been shown. There can be disposed in reactor 30 a conversion catalyst and the disposition of the catalyst can be made in any of the well known arrangements. Suffice to say, solids, which may come into contact with the catalytic bed or be deposited anywhere in the reactor causing undesirable results, have been collected in the lower part of assembly 31. Collected solids can be removed during periods of shutdown by providing flanged closure 26.

An advantage of this form of the invention lies in that the internal separator permits operation without meeting specifications of pressure vessels. In the embodiment in which the catalyst is disposed in the reactor, either surrounding and/or below the pipe and separator assembly, the assembly can be removed from the top of the reactor for servicing or cleaning without disturbing the catalytic bed.

Referring now to FIGURE 3, there is disposed in reactor 30 an assembly 31 which is like that of FIGURE 2. There is disposed beneath assembly 31 catalytic bed 32 which forms annulus 33 with the reactor vessel wall. Vapor from which solids have been separated passes into annulus 33, from annulus 33 radially into and through the catalyst bed, from the catalyst bed to withdrawal pipe 34 and from pipe 34 from the vessel.

*Example*

| | |
|---|---|
| Naphtha charge, b./d. | 16,000 |
| H$_2$/hydrocarbon mol ratio | 8:1 |
| Solids in charge before centrifuge, p.p.m.[1] | 105 |
| Solids in charge after centrifuge, p.p.m.[1] | 15 |
| Pressure in reaction zone, p.s.i.a. | 560 |
| Temperature in reaction zone, °F. | 880 |
| Space velocity, v./v./hr. | 2.8 |

[1] Based on oil, absent hydrogen.

Catalyst in reactor is an alumina containing a minor amount of platinum promoted by a minor amount of a halogen; the platinum (or platinum group) in the composition will be within the range of 0.05 to about 1.5 weight percent. The halogen, usually fluorine or chlorine, is in the amount of 0.1 and 3.0 weight basis on a dry alumina basis.

It will be evident to one skilled in the art in possession of this disclosure, having studied the same, that various details of construction and of steps, as well as pumps, valves, and other equipment, have been omitted. Generally, those items which are supplied by the design engineer are not incorporated for sake of simplicity.

The invention has wide applicability in the treatment of solids and, in its now preferred form, is particularly applicable to the refining and/or conversion of hydrocarbons, as in naphtha reforming, wherein solid deposits or scale are advantageously avoided. Since the invention is of a physical character, variations or modifications can be supplied by one skilled in the art in possession of this disclosure.

Reasonable variation and modification are possible within the scope of the foregoing disclosure, drawing and the appended claim to the invention the essence of which is that method and apparatus have been provided wherein solids or scale entrained in a fluid or vapor is removed from said vapor before it passes to a treating or conversion zone, in one embodiment the solids being removed by a centrifugal force and collected during the operation, in one modification of the embodiment the separation and collection being accomplished within a vessel also containing a treating or conversion zone which may contain a catalyst and, in another modification of the embodiment, the separation and collection being effected without a vessel in which the fluid or vapor is subjected to treatment or conversion.

I claim:

A naphtha reforming reactor for treating flowing naphthas containing entrained solids, comprising in combination:

(A) a vertically elongated, cylindrical enclosed vessel;
(B) a cylindrical fluid inlet tube of substantially lesser diameter than said vessel entering the top of said vessel, extending coaxially a substantial distance downwardly within said vessel, having a constant diameter within said vessel, and terminating in a closed end spaced apart from the top and bottom of said vessel, said closed end being adapted to collect solids separated from said naphthas;
(C) a stationary conical fluid deflector divergent in the direction of fluid flow, coaxially disposed within the constant diameter portion of said fluid inlet tube and forming an annulus therewith, and equipped with vane means adapted to impart rotational motion to said flowing naphthas;
(D) fluid outlet means disposed within said fluid inlet tube a substantial distance downstream of and separate from said stationary conical fluid deflector and a substantial distance upstream of and separate from said closed end, and comprising in combination
  (1) a cylindrical vent tube of substantially lesser diameter than said fluid inlet tube, disposed coaxially within and forming an annulus with said fluid inlet tube, and having an open lower end in vapor communication with said fluid inlet tube;
  (2) a manifold surmounting the upper end of said vent tube, being of substantially lesser external dimensions than the internal diameter of said fluid inlet tube and coaxially disposed therein, and being in open vapor communication with the interior of said vent tube;
  (3) a plurality of exit tubes radially penetrating the walls of said inlet tube and being in open vapor communication with said manifold and with the interior of said vessel;
(E) perforate, cylindrical hollow catalyst bed supporting means coaxially disposed within said vessel and forming therewith an annular space in open vapor communication with said exit tubes, said bed supporting means resting on the bottom of said vessel and terminating substantially below said closed end of said inlet tube;
(F) fluid collection means adapted to remove treated fluids from said vessel comprising a cylindrical perforate pipe coaxial with said vessel and extending through the bottom of said vessel, having substantially the same axial length as said catalyst bed supporting means, and forming with said supporting means an annular space adapted to contain catalyst.

References Cited by the Examiner

UNITED STATES PATENTS

| | | | |
|---|---|---|---|
| 434,216 | 8/1890 | Verrell | 55—452 |
| 1,360,349 | 11/1920 | Wright | 55—448 X |
| 1,434,562 | 11/1922 | Quam | 55—391 X |
| 1,438,553 | 12/1922 | Quam | 55—391 X |
| 1,603,878 | 10/1926 | Smith | 55—428 |
| 1,818,905 | 8/1931 | McGee | 55—391 X |
| 1,842,082 | 1/1932 | Edridge | 55—448 X |
| 2,304,778 | 12/1942 | Cresswell | 55—391 |
| 2,634,194 | 4/1953 | Nebeck | 23—288 |
| 2,650,675 | 9/1953 | Yellott | 55—1 |
| 2,905,633 | 9/1942 | Rosinki | 23—288 X |
| 2,969,318 | 1/1961 | Woodall | 23—288 X |
| 2,996,361 | 8/1961 | Brumbaugh | 23—288 |
| 2,997,374 | 8/1961 | Lavender et al. | 23—288 |
| 3,006,435 | 10/1961 | Alton et al. | 55—391 X |
| 3,051,561 | 8/1962 | Grimes | 23—288 |
| 3,100,141 | 8/1963 | Donovan | 23—288 |

FOREIGN PATENTS

| | | |
|---|---|---|
| 468,487 | 10/1950 | Canada. |
| 602,453 | 7/1960 | Canada. |
| 67,782 | 10/1948 | Denmark. |
| 133,711 | 11/1951 | Sweden. |
| 303,650 | 2/1955 | Switzerland. |

REUBEN FRIEDMAN, *Primary Examiner.*